J. D. JOHNSON.
DIFFERENTIAL MECHANISM.
APPLICATION FILED JAN. 16, 1917.

1,259,521.

Patented Mar. 19, 1918.
2 SHEETS—SHEET 1.

INVENTOR
John D. Johnson
BY
C. D. Hatkins
ATTORNEY

J. D. JOHNSON.
DIFFERENTIAL MECHANISM.
APPLICATION FILED JAN. 16, 1917.
1,259,521.
Patented Mar. 19, 1918.
2 SHEETS—SHEET 2.
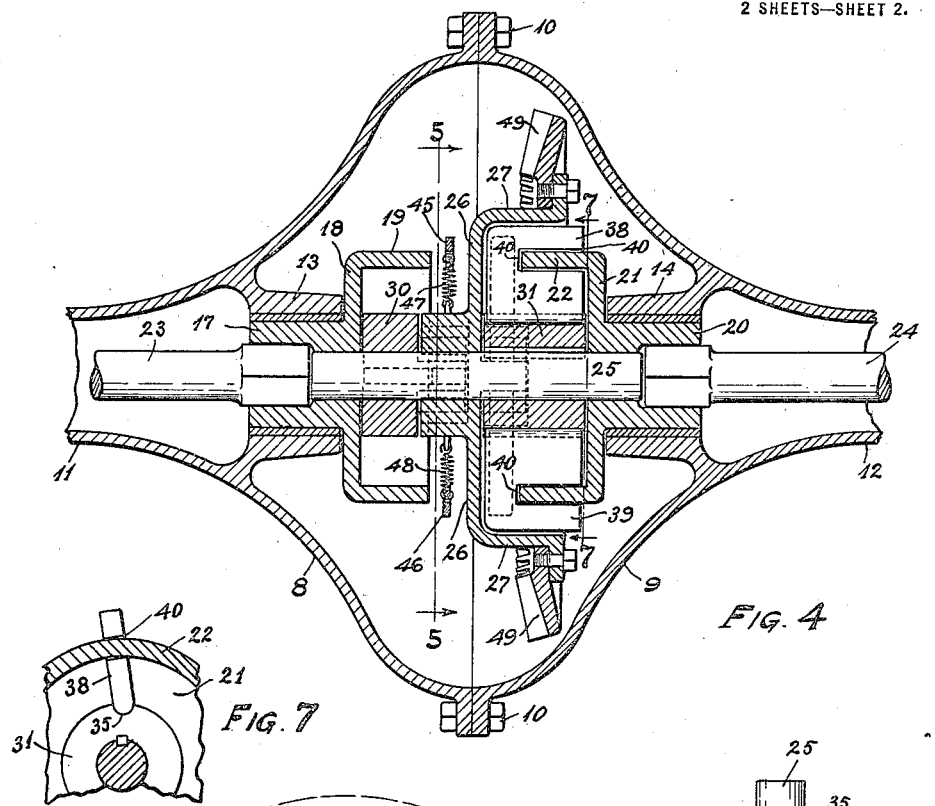
Fig. 4
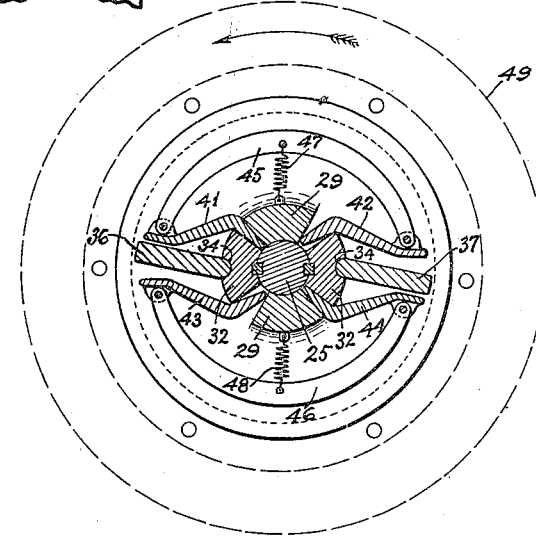
Fig. 7
Fig. 5
Fig. 6
INVENTOR
John D. Johnson
BY
C. D. Haskins
ATTORNEY

UNITED STATES PATENT OFFICE.

JOHN D. JOHNSON, OF SPOKANE, WASHINGTON.

DIFFERENTIAL MECHANISM.

1,259,521.   Specification of Letters Patent.   Patented Mar. 19, 1918.

Application filed January 16, 1917. Serial No. 142,758.

*To all whom it may concern:*

Be it known that I, JOHN D. JOHNSON, citizen of the United States, residing at Spokane, in the county of Spokane and State of Washington, have invented a certain new and useful Improvement in Differential Mechanism, of which the following is a specification.

My invention relates to improvements in differential mechanism, and the object of my invention is to provide a differential mechanism which shall be adapted to be associated with an automobile to communicate rotary motion from a shaft driven by the engine of said automobile to the tractor wheels thereof by such mode of operation that both of said tractor wheels shall be rotated at the same speed while said automobile is traveling in a straight course but each of which tractor wheels shall be permitted independently to rotate at any speed different from the speed of the other, as may be required at different instants of time, as when said automobile in its travel departs from a straight course and when it is traveling in a circular course.

A further object of my invention is to provide a differential mechanism for an automobile, the working parts of which mechanism shall be so operatively related that the energy exerted on one of such parts shall be transmitted to the tractor wheels of said automobile with little loss due to friction derived from the pressure of the wearing surface of any of its parts against the wearing surface of any other of its parts.

I accomplish these objects by mechanism illustrated in the accompanying drawings wherein—

Fig. 4 is a view of the same in vertical mid-section on broken line 4, 4 of Fig. 1;

Fig. 5 is a cross-sectional view of parts of the same on broken line 5, 5 of Fig. 4;

Fig. 6 is a view in side elevation of details of the same, a part of one of said details being broken away and shown in section; and Fig. 7 is a fragmentary view in cross-section of parts of the same on broken line 7, 7 of Fig. 4.

Figure 1:
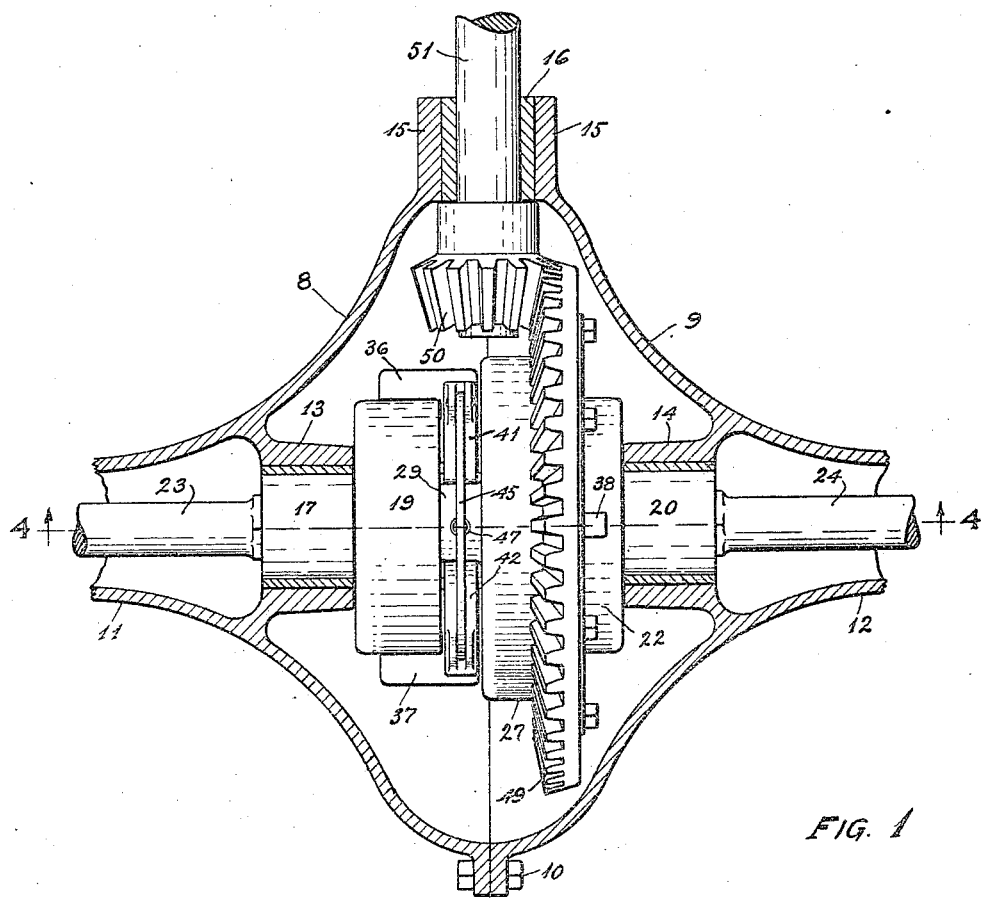
Figure 1 is a plan view of mechanism embodying one form of my invention, showing such mechanism disposed within a housing which is illustrated by a view in horizontal mid-section.
Figure 2:
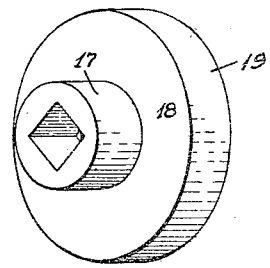
Fig. 2 is a perspective view of a detail of the same.

Referring to the drawings, throughout which like reference numerals designate like parts, a housing, of a form similar to that commonly used for containing and supporting the differential gearing of an automobile, is made of two separable cast metal parts 8 and 9 whose annular flanges are bolted together by bolts 10 to form a symmetrical hollow casing of the shape indicated in Figs. 1 and 4.

Each of the parts 8 and 9 is integral with a tube, as tubes 11 and 12, respectively, which tubes 11 and 12 are disposed to extend in opposite directions from the respective parts 8 and 9 with their axes in the same line to serve as axle housings of a well known form.

Concentrically disposed adjacent to the inner end of each of the tubes 11 and 12 is an integral journal bearing, as bearings 13 and 14, respectively, the axes of which bearings are in the same line.

In each of the flanged portions of the parts 8 and 9 and integral with corresponding points thereof is a radially extending half of a clamping collar 15 between which two halves is clamped a shaft bearing 16 whose axis is perpendicular to the axis of each of the journal bearings 13 and 14.

Rotatably disposed within the bearing 13 of the part 8 is the hub 17 of a disk 18 that is provided with an integral annular flange 19 that is concentrically disposed to project from the inner side of said disk 18.

Also, rotatably disposed in the bearing 14 of the opposite part 9 is an exactly similar hub 20 that is provided with an integral disk 21 and an annular flange 22 which correspond in all respects to the disk 18 and flange 19 of the hub 17 associated with the part 8, annular faces of the flanges 19 and 22 being opposite and spaced from each other as more clearly shown in Fig. 4.

Each of the oppositely disposed hubs 17 and 20 is provided with a concentrically disposed hole extending in a lengthwise direction therethrough, the inner half portion of its length being of circular form in cross-section while the outer half portion of its length is square in cross-section.

Projecting into the squared portion of each of the holes through the hubs 17 and 20 closely to fit therein is the squared end portion of a shaft, as shafts 23 and 24 respectively, which shafts 23 and 24 constitute the separate members of an axle to which the two tractor wheels (not shown) of an automobile may be rigidly fastened in a well known manner, whereby either of said shafts 23 and 24 may be independently rotated in response to rotary motion communicated to its associated one of the hubs 17 and 20.

Extending between the operatively disposed hubs 17 and 20 is a shaft 25 of circular cross-section, which is rotatably disposed with its opposite end portions freely projecting each into the circular end portion of the hole through the adjacent one of said hubs 17 and 20, said circular portions of the holes through said hubs 17 and 20 thus serving as bearings within which said shaft 25 may freely rotate.

Freely mounted to be rotatively movable on the central portion of the shaft 25 is a hubbed disk 26 which is provided with an integral flange 27, of angular form in radial section, which flange 27 projects in a sidewise direction to encircle the flange 22 of the disk 21, the internal diameter of said flange 27 being considerably larger than the external diameter of said flange 22 whereby is provided an annular space between the peripheral surface of the flange 22 and the internal surface of the flange 27 as shown in Fig. 4.

The disk 26 is integral with the central portion of its hub and on both sides of said disk 26 its hub is bifurcated to form two segments, as segments 28 and one of the segments 29 shown in Fig. 6, both of the segments 29 being shown in Fig. 5.

The segments 28 are symmetrically disposed to be spaced from each other by an angular distance of about one hundred degrees and the segments 29 are likewise spaced from each other; but the segments 28 are so disposed that their radial sides are in radial planes that are ninety degrees from the radial planes of the corresponding radial sides of the segments 29; in other words the segments 28 are disposed on the shaft 25 at such angular distance from the segments 29 that a radial plane through the centers of the segments 28 would be perpendicular to a radial plane through the centers of the segments 29.

Securely fastened on the shaft 25, concentric therewith, are two sleeves 30 and 31, both of which sleeves 30 and 31 are bifurcated each on one of its end portions to form segments, as segments 32 and 33, shown in Figs. 5 and 6, all of which segments 32 and 33 correspond exactly in angular dimensions and relative positions to the segments 28 and 29 of the hub of the disk 26.

The sleeve 30 is disposed with its unbifurcated end portion adjacent to the inner side of the disk 18 whereby it is encircled by the annular flange 19, its segments 32 projecting into the spaces between the segments 29 of the disk 26, while the sleeve 31 is disposed with its unbifurcated end portion adjacent to the inner side of the disk 21 whereby it is encircled by the flange 22, and its segments 33 project into the spaces between the segments 28 of the disk 26, whereby a rotative movement of the disk 26 on the shaft 25 is limited to an angular distance equal to the difference between the angular dimensions of the several segments and the angular dimensions of the several spaces within which said segments are respectively disposed.

Figure 3:
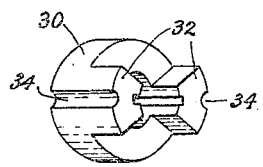
Fig. 3 is a perspective view of another detail of the same.

At opposite points on the periphery of the sleeve 30 are formed longitudinal grooves 34, of cross-section as shown more clearly in Fig. 3; and likewise at opposite points on the periphery of the sleeve 31 are corresponding longitudinal grooves like the groove 35 in Figs. 6 and 7.

Within each of the annular spaces encircled by the flanges 19 and 22 are two oppositely disposed clutching dogs 36 and 37 and clutching dogs 38 and 39 respectively, each of which clutching dogs is of rectangular form and has one of its end surfaces rounded and is provided with a transverse slot 40 that extends from one of its side edges toward its opposite side edge for about two thirds of the distance therebetween, said slot being of a width very slightly greater than the thickness of either of the flanges 19 and 22, and disposed at such distance from and parallel with the rounded end surface of said dogs, that when said rounded end surface is disposed in one of the grooves 34 or 35 of a sleeve 30 and 31 to extend radially therefrom, then the associated flange 19 or 22 will project within said slot 40, as shown more clearly in Figs. 4 and 7.

With the clutching dogs 36 and 37 and the clutching dogs 38 and 39 thus relatively disposed within the flanges 19 and 22 respectively, it is obvious that a rotative movement of the disk 26, relative to either of the flanges 19 and 22, will swing the clutching dogs sidewise from their radial positions thus to cause the walls of their slots 40 to clutch the associated one of the flanges 19 and 22 and thereby communicate rotary motion from the disk 26 to the disks 18 and 21.

In order to control the sidewise swinging movements of the clutching dogs 36 and 37, 38 and 39 to cause them to clutch and unclutch their respective flanges at proper times, I have disposed adjacent to each side of each clutching dog a lever, the wedge shaped end of which lever projects freely into the adjacent space between a segment of a sleeve and a segment of the hub of the disk 26, as illustrated in Fig. 5 where the wedge shaped ends of the levers 41 and 42 are disposed in the spaces between the segments 32 and the segments 29 on one side of the clutching dogs 36 and 37, and the wedge shaped ends of the levers 43 and 44 are disposed in the spaces between the segments 32 and the segment 29 on the other side of said clutching dogs 36 and 37.

The outer end of the lever 41 is articulated to one end of a bow 45 whose other end is articulated to the outer end of the lever 42; and the outer end of the lever 43 is articulated to one end of another bow 46 whose other end is articulated to the outer end of the lever 44.

Connected to the central portion of each of the bows 45 and 46 is one end of a helical tension spring (as springs 47 and 48 respectively) whose other end is connected to the adjacent one of the segments 29, whereby such spring may exert its force with a tendency to move its attached bow toward its attached segment thereby to cause the levers 41 and 42 and the levers 43 and 44 to pry against the radial sides of the segments 32 into a position midway between the segments 29 in an obvious manner to unclutch the clutching dogs 36 and 37.

The clutching dogs 38 and 39 and segments 28 and 33 are associated with similarly disposed levers and bows not shown.

With the relative movements of the sleeves 30 and 31 and the hub of the disk 26 thus controlled it is obvious that a rotation of the disk 26 in either direction will cause both of the axle shafts 23 and 24 to rotate in the same direction by reason of the clutching of all the clutching dogs, but if either of the axle shafts 23 and 24 revolves faster in the same direction than the disk 26 by reason of its tractor wheel traveling around the outer side of a curved roadway, then the clutching dogs associated with such axle shaft will unclutch to permit its associated flange to slip through the slots of said clutching dogs.

Securely fastened to the flange 27 of the disk 26 is a beveled gearwheel 49 which operatively engages with a beveled pinion 50 that is fastened on to the end portion of a shaft 51 that projects inwardly through the bearing 16, as shown more clearly in Fig. 1, said shaft 51 being operatively connected, in a manner not shown, with the driving shaft of the engine of the automobile whereby the tractor wheels of the automobile may be rotated in either direction and one of them will be permitted to rotate at a greater speed than the other while traveling around a curve in a roadway.

Obviously changes may be made in the forms, dimensions and arrangement of parts of my invention without departing from the spirit thereof.

What I claim is:

1. A differential mechanism of the class described, embodying a housing provided with two journal bearings each disposed in a different one of its opposite end walls with its axis in the line of the axis of the other, and further provided with a shaft bearing in one of its sides with its axis perpendicular to the axial line of said two journal bearings; two disks each provided with a hub that projects from one side thereof and with an integral annular flange that projects from the other side thereof, each of said disks disposed within said housing with its hub rotatably disposed within a different one of said oppositely disposed journal bearings, and the hub of each of said disks being provided with a concentrically disposed hole extending therethrough; two shafts disposed each with one of its end portions projected within the outer end portion of the hole in the hub of a different one of said disks and adapted to be rotated in response to rotative movements of said one of said disks; a shorter shaft disposed with each of its end portions projected within the inner end portion of the hole in the hub of a different one of said disks to be rotatable therein; a disk having a hub and mounted on the central portion of said shorter shaft and adapted to be rotatively moved with respect thereof, the hub of said disk projecting from each of the opposite sides thereof and both projecting portions being radially bifurcated to form two segments on each side of said disk; two sleeves each having one of its end portions radially bifurcated to form oppositely disposed segments, and each rigidly mounted on said shorter shaft with its unbifurcated end portion adjacent to the inner side of a different one of said first named disks and with its segments projected into the radial spaces between the segments of the adjacent portion of the hub of the centrally disposed disk, said spaces being of greater angular dimensions than the angular dimensions of said segments; two clutching dogs associated with each of said sleeves and with the annular flange of the adjacent disk whereby said adjacent disk will be rotated in response to a rotation of said shorter shaft; a separate lever disposed on each side of each of said clutching dogs with one of its end portions projected into the radial space between adjacent ones of said segments; a separate connecting member disposed on each of opposite sides of each of said sleeves with its opposite end portions pivotally connected each to the outer end of the adjacent one of said levers; resilient means associated with each of said connecting members to exert force thereon that tends to cause its associated levers to move their associated segments to equi-distant circumferential position on said shorter shaft thereby normally to maintain the adjacent clutching dogs unclutched from their associated annular flange.

2. A differential mechanism of the class described, embodying a housing provided with two journal bearings spaced one from the other with their axes in the same line; two disks each provided with a hub that projects from one of its sides and with a flange that projects from its other side, said disks being disposed within said inclosing housing each with its hub rotatably disposed within a different one of said journal bearings; a shaft disposed with its opposite end portions rotatably mounted each in a different one of bearings formed in the hubs of said two disks; clutching dogs operatively associated with said shaft and with the inner and outer faces of the flange of each of said two disks; a gear wheel mounted on said shaft and adapted to be rotatively moved thereon throughout a limited angular distance; and mechanism associated with said gear wheel and with the clutching dogs of the flange of each of said two disks whereby said clutching dogs may be actuated in response to limited rotative movements of said gear wheel on said shaft.

3. A differential mechanism including a housing, alined horizontal bearings therein, disks having hubs journaled in said bearings, axle shafts keyed to said hubs to rotate therewith, the inner ends of the axle shafts being spaced, a stub shaft journaled in said hubs intermediate the adjacent ends of the axle shafts, a pair of sleeves fixed to said stub shaft adjacent the said disks, inwardly directed flanges carried by said disks and overlying said sleeves, oppositely disposed dogs having slots in their side faces, said slots adapted to receive said flanges and a power mechanism on said stub shaft adapted to rotate the same relative to said flanges to cause the dogs coöperating therewith to bind on said flanges and impart rotary motion thereto.

4. A differential mechanism including a housing, alined horizontal bearings therein, disks having hubs journaled in said bearings, axle shafts keyed to said hubs to rotate therewith, the inner ends of the axle shafts being spaced, a stub shaft journaled in said hubs intermediate the adjacent ends of the axle shafts, a pair of sleeves fixed to said stub shaft adjacent the said disks, inwardly directed flanges carried by said disks and overlying said sleeves, oppositely disposed dogs having slots in their side faces, said slots adapted to receive said flanges and a power mechanism on said stub shaft adapted to rotate the same relative to said flanges to cause the dogs coöperating therewith to bind on said flanges and impart rotary motion thereto, the said dogs engaging the disk flanges in a manner to permit either of the flanges to travel slower than the other flange.

5. A differential mechanism including a housing, alined horizontal bearings therein, disks having hubs journaled in said bearings, axle shafts keyed to said hubs to rotate therewith, the inner ends of the axle shafts being spaced, a stub shaft journaled in said hubs intermediate the adjacent ends of the axle shafts, a pair of sleeves fixed to said stub shaft adjacent the said disks, inwardly directed flanges carried by said disks and overlying said sleeves, segment shaped lugs carried by the sleeves, a power disk on said stub shaft having segment shaped lugs coöperating with the sleeve lugs, and means extending between the sleeves and disk flanges and straddling said flanges to bind therewith during movement of the power disk in one direction.

6. A differential mechanism including a housing, alined horizontal bearings therein, disks having hubs journaled in said bearings, axle shafts keyed to said hubs to rotate therewith, the inner ends of the axle shafts being spaced, a stub shaft journaled in said hubs intermediate the adjacent ends of the axle shafts, a pair of sleeves fixed to said stub shaft adjacent the said disks, inwardly directed flanges carried by said disks and overlying the sleeves, segment shaped lugs carried by the sleeves, a power disk on said stub shaft having segment shaped lugs coöperating with the sleeve lugs, means extending between the sleeves and disk flanges and straddling said flanges to bind therewith during movement of the power disk in one direction, and means arranged within said housing and adapted normally to hold the adjacent faces of the coöperating segment shaped lugs spaced.

In witness whereof, I hereunto subscribe my name this 29th day of December, A. D. 1916.

JOHN D. JOHNSON.

Witnesses:
FRANK WARREN,
GEO. BLAIR.